United States Patent [19]
Pelekanos et al.

[11] Patent Number: 5,521,398
[45] Date of Patent: May 28, 1996

[54] QUANTUM WELL HETEROSTRUCTURE OPTICAL OPERATOR

[75] Inventors: Nikolaos Pelekanos, Perros-Quirec; Benoît Deveaud-Pledran; Philippe Gravey, both of Lannion; Jean-Michel Gerard, Paris, all of France

[73] Assignee: France Telecom, Paris, France

[21] Appl. No.: 351,774

[22] Filed: Dec. 8, 1994

[30] Foreign Application Priority Data

Dec. 9, 1993 [FR] France .................................. 93 14789

[51] Int. Cl.⁶ ...................... H01L 29/06; H01L 31/0328; H01L 31/0336
[52] U.S. Cl. ................. 257/17; 257/21; 257/22; 257/23; 257/25; 359/248
[58] Field of Search ................... 257/21, 17, 22, 257/15, 23, 25, 185, 201, 85; 359/248, 569

[56] References Cited

U.S. PATENT DOCUMENTS 4,796,067 1/1989 Shimizu et al. ...................... 257/17 X

FOREIGN PATENT DOCUMENTS

| 0478060 | 9/1991 | European Pat. Off. |
|---|---|---|
| 3179428 | 5/1991 | Japan .................................. 257/21 |
| WO-A-9222847 | 6/1992 | WIPO . |

OTHER PUBLICATIONS

Paton et al., "A Novel Asymmetrically Coupled Quantum Well Infrared Modulator," *Superlattices and Microstructures*, vol. 4, No. 6, 1988, pp. 737–739.

Sommers et al., "Variably Spaced Superlattice Energy Filter, a New Device Design Concept for High–Energy Electron Injection," *Appl. Phys. Lett.* 48 (12), 24 Mar. 1986, pp. 806–808.

Journal of the Optical Society of America, vol. 7, No. 11, Nov. 1990, New York, US, pp. 2217–2225.

Applied Physics Letters, vol. 59, No. 7000, Oct. 1991, New York, US, pp. 1832–1834.

*Primary Examiner*—William Mintel
*Attorney, Agent, or Firm*—Blakely, Sokoloff, Taylor & Zafman

[57] ABSTRACT

An optical operator designed to be subjected to write radiation for processing read radiation that it receives, the operator comprising an electro-optical material (Q2), first and second materials (Q1, Q3) distributed on either side of the electro-optical material (Q2), said first and second materials (Q1, Q3) being collection quantum wells. Quantum barrier forming materials (6, 8) are interposed between said two materials (Q1, Q3) and the electro-optical material (Q2), with one of the quantum barrier forming materials (6) constituting a filter such that charges of a certain sign photoexcited by the write radiation in a material (4, Q1) on one side of said filter pass through it in the absence of an external electric field to relax in the collection quantum well (Q3) situated on the other side of the filter (6), while charges of opposite sign are blocked by the filter (6) in the other collection well (Q1).

13 Claims, 4 Drawing Sheets

QUANTUM WELL HETEROSTRUCTURE OPTICAL OPERATOR

BACKGROUND OF THE INVENTION

The present invention relates to a heterostructure optical operator having quantum wells, particularly, but not necessarily, an operator such as a photorefractive operator.

In a photorefractive (PR) crystal, two incident coherent laser beams produce an interference pattern which writes an index grating. The grating can then be used in turn to deflect a third incident beam in a direction that depends entirely on the properties of the grating. The suitability of PR materials for having an index grating written optically therein, and thus enabling the deflection of a laser beam to be controlled, makes such materials particularly advantageous for switching optical signals in a broadband telecommunications network. For example, a matrix having N fiber inputs can be interconnected with a matrix having M fiber outputs. Another particularly advantageous technological application lies in parallel and ultrafast processing of images for pattern recognition and for neural networks.

Most studies of these applications concern solid PR crystals. In this context, reference may be made to the reference work:

[1] "Photorefractive materials and their applications I", by P. Günter, J. P. Huignard, Springer, Berlin, 1988.

Nevertheless, solid crystals suffer from two major drawbacks, namely relatively long response times (of the order of a millisecond), and very strict alignment requirements, due to the phenomenon of Bragg diffraction.

These problems have led several teams throughout the world to propose thin-layer photodiffractive devices based on quantum wells. In devices of that type, the incident interference pattern induces considerable modulation of the refractive index and of the absorption coefficient (respectively $\Delta\eta$ and $\Delta\alpha$) by means of high electro-optical coefficients about the forbidden band of the quantum wells. Such devices naturally have very short response times (of the order of one microsecond), and their short optical length makes it possible to avoid the Bragg diffraction phenomenon.

With respect to such thin-film photorefractive devices known in the prior art, reference may advantageously be made to the various following publications:

[2] Q. Wang, R. M. Brubaker, D. D. Nolte, and M. R. Melloch, J. Opt. Soc. Am. B9, 1626 (1992) together with the references cited therein;

[3] A. Partovi, A. M. Glass, D. H. Olson, G. J. Zydjik, H. M. O'Bryan, T. H. Chiu, and W. H. Knox, Appl. Phys. Lett. 62, 464 (1993); ibid 59, 1832 (1991);

[4] G. Picoli, P. Gravey, and J. E. Viallet, French patent application published under the number 2 678 093.

The photodiffractive devices that have been described in the past assume that an external electric field is applied parallel to or perpendicular to the plane of the quantum wells. The perpendicular configuration is the most advantageous because of the significant electro-optical effect obtained by the quantum confined Stark effect (QCSE). In this respect, reference may advantageously be made to the following publication:

[5] D. A. B. Miller, D. S. Chemla, T. C. Damen, A. C. Gossard, W. Weigmann, T. H. Wood, C. A. Burrus, Phys. Rev., B32, 1043 (1985).

In the device described in [3], the photodiffraction mechanism may be analyzed as follows:

1) The wavelength is adjusted to a value close to exciton resonance with high levels of absorption.

2) The photo-created electron-hole pairs in the wells pass through the barriers and are attracted to the electrodes by the electric field.

3) The carriers close to the electrodes are trapped and screen the applied electric field, creating large $\Delta\eta$ and $\Delta\alpha$ by the quantum confined Stark effect.

4) If photoexcitation is created with an interference pattern, then a $\Delta\eta$ and $\Delta\alpha$ array is obtained in phase with the intensity pattern of the laser. In this operating plane, although the trapping phenomenon at the interface between the electrodes and the semiconductor is not manifest, these researchers have found relatively high diffraction efficiencies of 3%, but with the important restriction that the period of the grating must remain relatively large (30 µm). When the grating period is reduced by a factor of 10, then the diffraction efficiency is rapidly reduced by a factor of 1000. This has to do with the lateral diffusion of the carriers that takes place, either during displacement towards the electrodes, or else after trapping at the electro-semiconductor interface (erasing the grating).

Various solutions have been proposed to obtain better microscopic understanding and better control over the trapping mechanism. For example, FR-A-2 678 093 envisages epitaxial growth of a semi-insulating InP:Fe layer having a thickness of a few microns on the layer having multiple quantum wells, where InP:Fe is known for its photorefractive properties and is used as a medium in which gratings can be written. Gratings can be written in this way either by direct photoexcitation of deep centers beneath the forbidden band of the multiple quantum wells, or else by photogeneration of carriers in the multiple quantum well region, where the carriers then escape and are trapped in the InP:Fe layer. In FR-A-2 678 093, the unit pattern is repeated to obtain a larger effect. If analysis is restricted to the operation of a single pattern only, then the diffraction efficiency is limited because of the value of the diffusion field in solid InP:Fe (about 1 kV/cm). Under such circumstances, that means it is necessary to use an external electric field to improve the diffraction efficiency.

One way or another, all of the above-specified studies rely on an external electric field being applied. That requires lengthy and difficult processing to be applied to the samples, which imposes further constraints on the performance of the device, on its suitability for being integrated in a system, and on the possibility of miniaturizing it.

SUMMARY OF THE INVENTION

A particular object of the present invention is to provide improvements on this essential point by proposing an optical operator capable of being controlled in purely optical manner, without requiring an external electric field to be applied.

In addition, the photorefractive operator proposed by the invention provides usable diffraction efficiency and space resolution of less than 5 µm.

Furthermore, it provides response times that are adjustable around 1 µsec, and makes it possible to escape from Bragg alignment conditions.

Furthermore, the solutions proposed by the invention treat the problem of lateral diffusion which degrades the space resolution of the photodiffractive device studied in [3].

Proposals have already been made in document EP-478 060 to make use of electron transfer of the Γ-X type for separating electrons and holes on either side of an electro-optical material so as to create an electrical field for switching an intermediate electro-optical material. The only transfer mechanism envisaged in that document is Γ-X type transfer, with the electrons passing from a first well towards an adjacent barrier, and from said barrier towards a second well because of the existence of an intermediate electron state in the barrier.

For said transfer mechanism to be capable of acting, the width of the barrier must necessarily be limited to a value of about 3.5 nm. The confined Stark effect (QSCE) is very limited because of the large width of the associated exciton line.

The invention proposes a structure that enables said major drawback to be mitigated.

To this end, the invention provides an optical generator designed to be subjected to write radiation that controls it for the purpose of processing read radiation it receives, the operator including at least one elementary stack comprising first and second materials that form quantum wells for collecting electrons and holes, which wells are disposed on either side of an electro-optical structure which includes an intermediate quantum well and two quantum barriers interposed between-said intermediate quantum well and the collection quantum wells, one of the quantum barriers having for charges of a particular sign, at least one energy level which is intermediate between the energy levels presented for charges of the same sign by the intermediate quantum well and the collection quantum well separated from said intermediate quantum well by said barrier, said charges, when photoexcited by the write radiation in said collection quantum well passing through said quantum barrier to said intermediate quantum well, taking one or more intermediate energy levels, while charges of the opposite sign are blocked by said quantum barrier in said collection quantum well, the operator being characterized in that the second quantum barrier is a narrow barrier through which the charges transferred into the intermediate quantum well pass by means of the tunnel effect to relax in the second collection quantum well.

Thus, in the structure proposed by the invention, charges are transferred from a collection well to a wide intermediate well by using an intermediate electron state in the barrier, and are then transferred from the intermediate well towards a final collection well by the tunnel effect.

It is thus possible to choose the width of the intermediate well in such a manner as to maximize the electro-optical effect (e.g. 15 nm of GaAs).

It may be observed that transfer from the first collection well towards the intermediate well may be constituted by electron transfer of Γ-X type or by hole transfer by heavy-hole to light-hole (HH-LH) type diffusion.

When applied to a photoreactive device, it will be observed that islands or inclusions of InAs are advantageously incorporated in the materials forming the collection quantum wells.

DETAILED DESCRIPTION OF THE INVENTION

Figure 1:
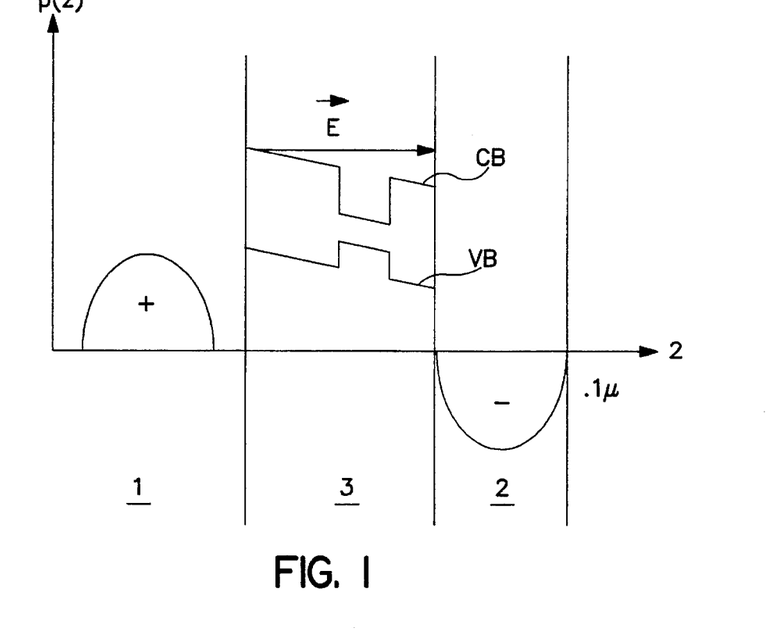
FIG. 1 shows a charge distribution in the thickness of an all-optical elementary photodiffractive heterostructure of a device of the invention receiving write radiation.

The operating principle of an all-optical operator of the invention is shown in FIG. 1.

Each period of the heterostructure, being about 0.1 μm, is designed in such a manner that the photogenerated carriers after photoexcitation by write radiation above a forbidden energy band of the heterostructure are highly separated, relaxing in different zones 1 and 2 of the heterostructure period. These zones 1 and 2 are collection quantum wells, in which there accumulates high densities of electrons and of holes, respectively.

These accumulations give rise locally to a space charge electric field E. The electric field E has its maximum in the region 3 situated between the collection quantum wells 1 and 2. By the quantum confined Stark effect it modulates a third quantum well situated in the region 3 and having an exciton resonant wavelength equal to that of the read radiation applied to the device for the purpose of being diffracted. In FIG. 1, there can be seen diagrammatically the deformations of the conduction band CB and of the valence band VB of the quantum well in the zone 3 under the effect of the photo-created field E.

As the power density of the write radiation laser increases, so the charge density increases, as does the local intensity of the photo-created electric field E.

In the particular case of a photorefractive operator, excitation is caused that has an interference pattern, generating a $\Delta\eta$ and $\Delta\alpha$ grating that is written in phase with the input grating, at wavelengths in the vicinity of the active quantum well.

Figure 2:
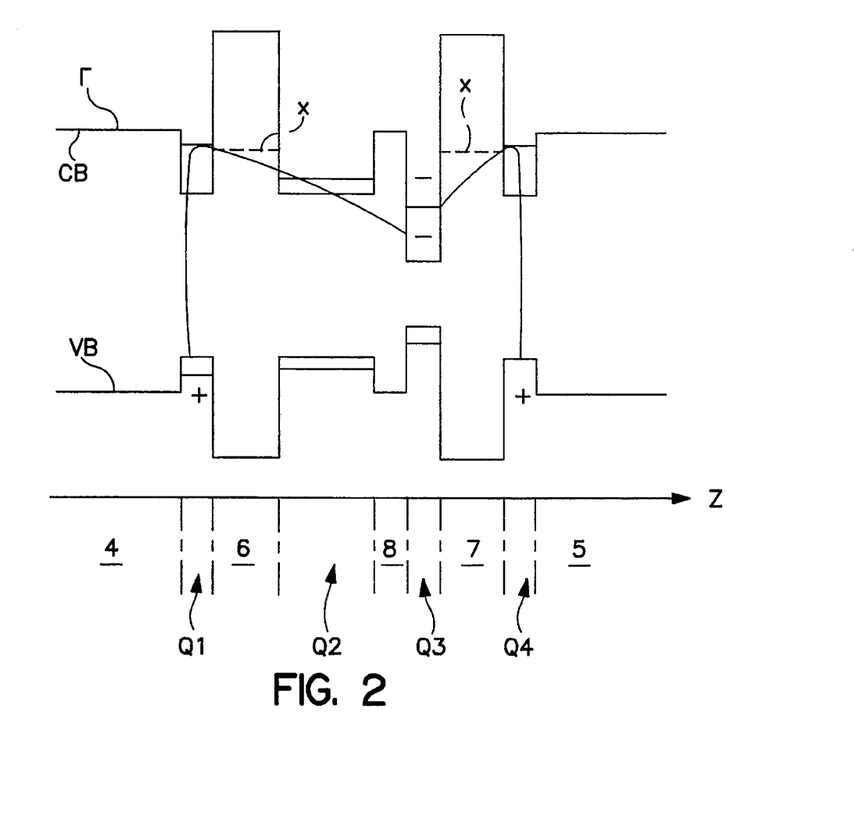
FIG. 2 is a diagram of an all-optical elementary photodiffractive heterostructure based on Γ-X electron transfer in a device constituting a particular embodiment of the invention.
Figure 3:
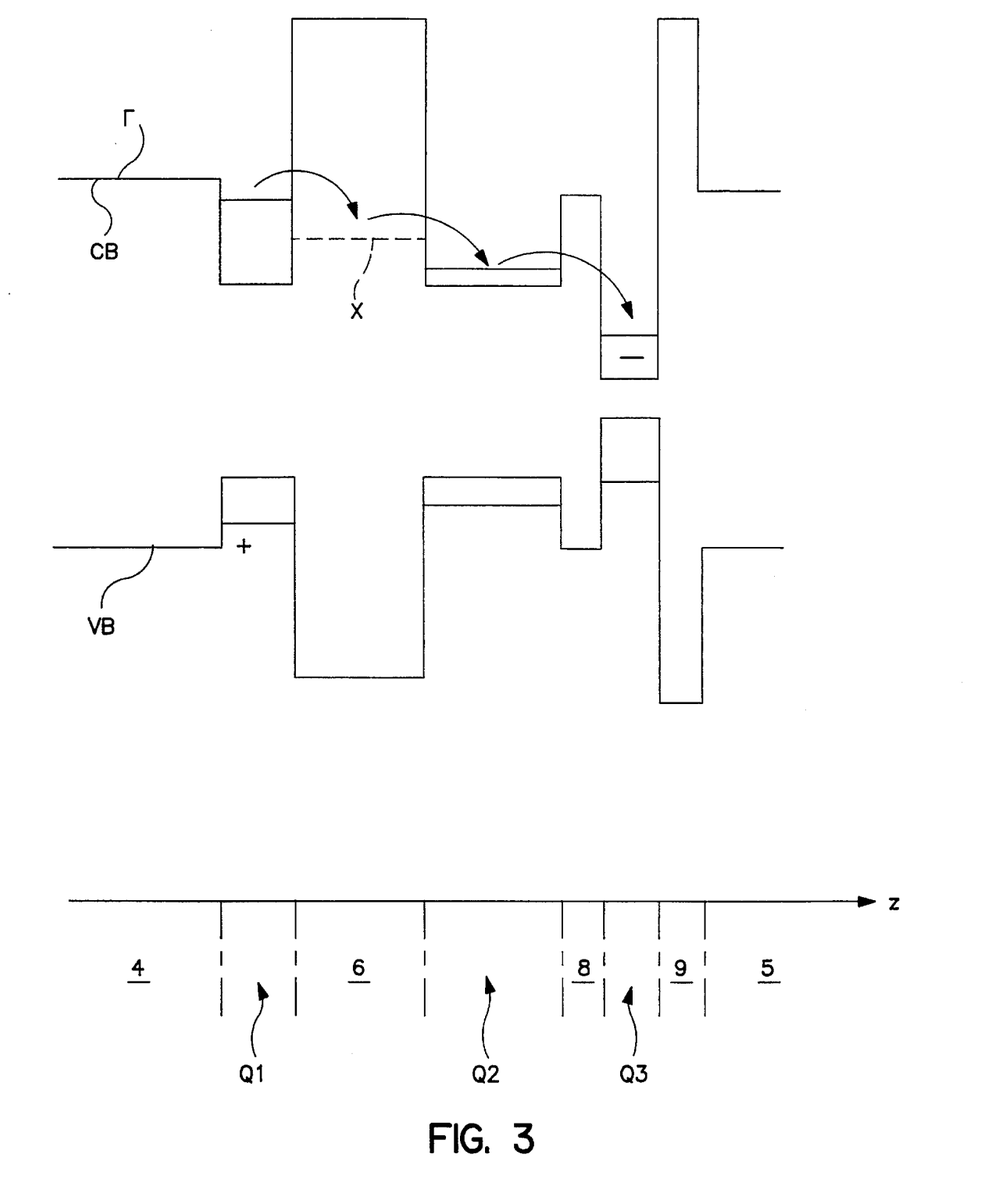
FIG. 3 is a diagram of another all-optical elementary photodiffraction heterostructure based on Γ-X electron transfer.

Several heterostructure and physical mechanism designs may be envisaged. The elementary photodiffractive heterostructures shown in FIGS. 2 and 3 are based on Γ-X electron transfer. The semiconductors used are GaAs, AlAs, InAs, and ternary alloys thereof. Molecular beam epitaxy of such materials in various combinations has been available for about 15 years.

In FIG. 2, the elementary heterostructure shown comprises four quantum wells, given references Q1 to Q4 reading from left to right in FIG. 2.

Quantum wells Q1 and Q4 are narrow GaAs layers (≤35 Å) and each of them is surrounded by a barrier of $Al_xGa_{1-x}As$ referenced 4 and 5 (where typically x= 40% and the thickness is 500 Å), and by a barrier AlAs (50 Å to 300 Å) referenced 6, 7.

In accordance with one of the aspects of the invention, the narrow GaAs quantum wells Q1 and Q4 combine with the adjacent AlAs barriers 6, 7. During resonant photoexcitation with the AlGaAs barriers 4, 5 ($\lambda_{write} \approx 650$ nm), or with narrow GaAs quantum wells Q1 and Q4 ($\lambda_{write} \approx 750$ nm), said combination acts on the photo-carriers of the quantum well Q1 and of the quantum well Q4 as would a one-way quantum "sieve", keeping holes outside the quantum wells Q1 and Q4 while allowing electrons to be transferred towards the quantum well Q2 and the quantum well Q3.

The electron transfer is a Γ-X transfer represented diagrammatically by two arrows in FIG. 2. Γ-X transfer in (Al,Ga)As/AlAs heterostructures has been described in particular in the following publication:

[6] J. Feldman, J. Nunnenkamp, G. Peter, E. Göbel, J. Kuhl, K. Ploog, P. Dawson, C. T. Foxon, Phys. Rev. B 42, 5809 (1990).

In that publication, it is explained, in particular, that the energy level of the electrons at the Γ point in the GaAs quantum well can be higher than that at the X point in the AlAs barrier, providing the thickness of the GaAs quantum well is ≤40 Å. Γ-X electron transfer times of about 0.1 psec to 1 psec have been measured. These values depend directly on the space overlap of the wave functions of the Γ and X electrons in the various layers.

Thus, in short (picosecond) periods of time, holes will begin to accumulate in the quantum well Q1 and in the quantum well Q4, whereas electrons will accumulate in the quantum well Q3 which is constituted in this case by a layer of $In_xGa_{1-x}As$ having a thickness of 100 Å to 300 Å (where x= 0.05 to 0.15). It will be observed that the electrons passing from the quantum well Q1 into the quantum well Q2 will also accumulate in the quantum well Q3, using the tunnel effect to pass through the narrow interposed AlGaAs barrier 8.

The electric field as photo-created in this way acts on the exciton resonance of the quantum well Q2 which is constituted in this case by a layer of GaAs having a thickness of 100 Å to 300 Å. The read wavelength $\lambda_{read}$ is then ≈850 nm± 30 nm.

To form an intense electric field, the heavy holes must remain as long as possible in the quantum well Q1 and in the quantum well Q4. The difference between the energies of the forbidden bands of GaAs and of AlAs at the Γ point is 1500 meV. If this difference is distributed between the conduction band and the valence band in a ratio of 66 to 34, then a hole potential barrier is obtained of $E_b$= 500 meV. This value is sufficient, but, in principle, it is possible to obtain a very long tunnel effect transfer time by varying the thickness of the AlAs. However, account must also be taken of another phenomenon for a device operating at ambient temperature: this phenomenon is hole transfer over the AlAs barrier by thermal emission of ions.

As has already been established by the following publications:

[7] H. Schneider and K. V. Kiltzing, Phys. Rev. B 38, 6160 (1988); and

[8] J. A. Cavailles, D. A. B. Miller, J. E. Cunningham, P. Li Kam Wa, A. Miller, Appl. Phys. Lett. 61, 426 (1992); it is possible to evaluate said transfer time by thermal emission of ions using the following equation:

$$\tau = W \left( \frac{2\pi m}{KT} \right)^{1/2} \exp \left( \frac{E_b - E - eFW/2}{KT} \right) \quad (1)$$

where W is the thickness of the quantum well, m is the mass of a heavy hole (≈ 0.5 $m_O$), $E_b$=500 meV, E is the hole confinement energy (≤120 meV), and F is the electric field. The contribution of the electric field in the exponent is negligible if W= Å and F= $5 \times 10^4$ V/cm. From equation (1) it appears that τ≈1 μsec at ambient temperature, thus making very high electric field values possible, as explained below.

An all-optical device of this kind is efficient, ultrafast, and operates at moderate laser powers.

It has been shown that by using lasers of moderate power (a few tens of W/cm$^2$) in continuous field or operating in pulse mode, it is possible to create electric fields that are sufficiently high and that are generated in the heterostructure by an all-optical method.

In a variant, as shown in FIG. 3, the elementary heterostructure stack need have only three wells Q1 to Q3, with only the well Q3 being separated from the layer 5 by a narrow barrier 9. As represented by the arrows in FIG. 3, electrons are transferred through the barrier 6 from the collection well Q1 to the intermediate well Q2 by Γ-X type transfer, and they then pass through the barrier 8 by the tunnel effect.

A model of the behavior of the FIG. 2 heterostructure is described below. The model used, which is based on digital integration of a system of coupled differential equations, is an extension of the model described in:

[9] R. Strobel, R. Eccleston, J. Kuhl, K. Köhler, Phys. Rev. B 43, 12564 (1991).

For each quantum well, account is taken of the equations for three different species: electrons, holes, and excitons. The electrons and the holes can pass from one quantum well to another with different time constants, and together they form respective excitons at a bimolecular formation rate. To simplify, it may be assumed that they can thus transfer from one quantum well to another even when they have formed an exciton, and using the same transfer times as when they are free. The main assumption of this model is that the only process which causes energy to be lost from our system of particles is radiant combination of excitons.

The results given herein were obtained using an electron transfer time $\tau_O$ through the GaAs/AlAs quantum "sieve" equal to 1 psec, with the hole transfer time $\tau_{Oh}$ being used as an adjustable parameter. The times required by the electrons and by the holes to tunnel through the thin AlGaAs layer are assumed to be equal to 10 psec and to 100 psec, respectively. Finally, the exciton recombination time is assumed to be equal to 1000 psec. In fact, our calculations have shown that the accumulated charge density values depend to a very large extent on the ratio $\tau_{Oh}/\tau_O$, which is representative of carrier transfer asymmetry, and that in order to photo-create an electric field ≥20 kV/cm, this ratio must be ≥$10^4$.

Figure 4:
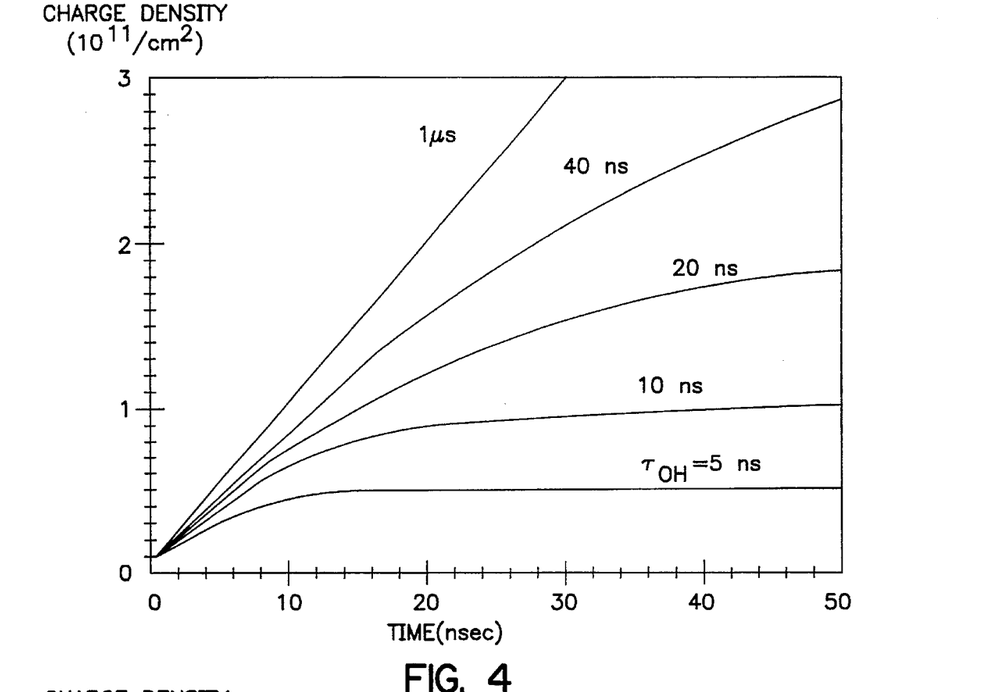
FIG. 4 is a graph as a function of time applicable to the FIG. 2 heterostructure of a model of charge density accumulated in the electron collection well for different values of $\tau_{Oh}$ of the hole transfer time, where the power $P_O$ of the incident laser beam is 40 W/cm$^2$.
Figure 5:
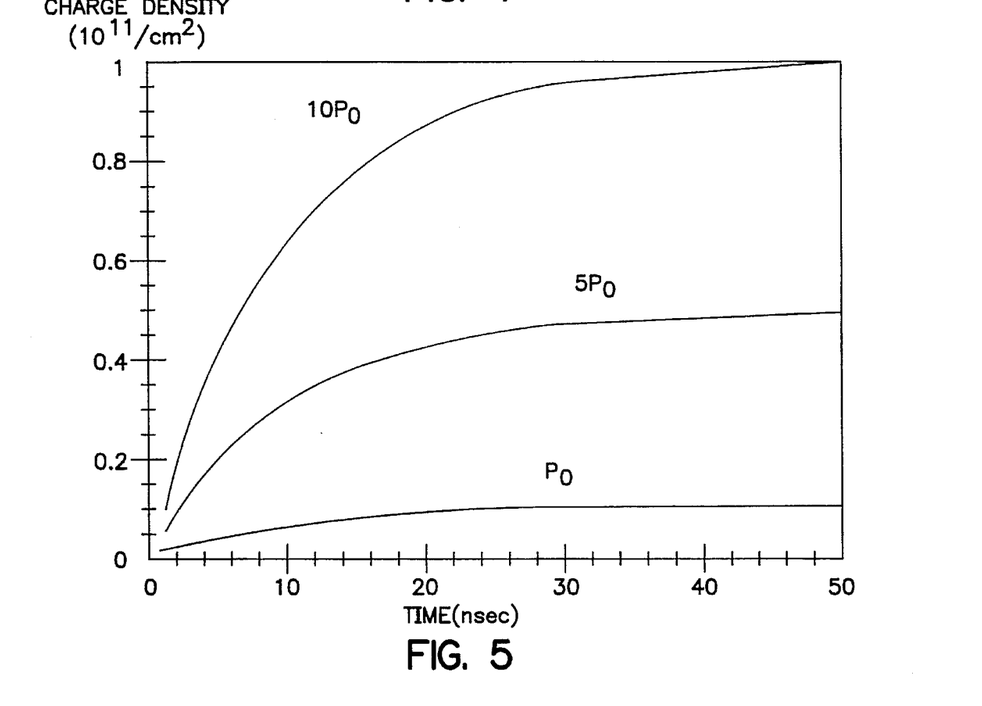
FIG. 5 is applicable to the FIG. 2 heterostructure and represents a model of charge density accumulated in the electron collection well as a function of time for different values of laser power ($P_O$=4/cm$^2$)

FIG. 4 shows the charge density accumulated in the quantum well Q3 as a function of time following the appearance of a continuous laser field at t=0, and for different values of $\tau_{Oh}$. It is assumed that the power density is equal to 40 W/cm$^2$ and that the laser wavelength is adjusted to above the forbidden band of AlGaAs. The charge density becomes stable after a response time of several $\tau_{Oh}$, and reaches values that depend strongly on $\tau_{Oh}$. It will be observed that it is possible to adjust $\tau_{Oh}$ to less than 1 μsec, by modifying the thickness of the AlAs barrier, thus making it possible to further reduce the response time of the device. It is easy to obtain charge densities of the order of a few $10^{11}/cm^2$ with relatively moderate values of $\tau_{Oh}$, given that the time required for thermal emission of ions at ambient temperature leads to an estimate for $\tau_{Oh}$ that is about 1 μsec. A charge density of $3\times10^{11}/cm^2$ corresponds to an electric field in the active quantum well of ≈50 kV/cm. In this electric field, it may be expected from reference [5] that $\Delta\eta_{max}=0.05$ and $\Delta\alpha_{max}=5000$ cm$^{-1}$. However, it will be observed that with electric fields $\leq 50$ kV/cm, account needs to be taken of the possibility of band curvature causing large inverse transfer rates by the tunnel effect (as described in:

[10] R. Sauer, K. Thonke, W. T. Tsang, Phys. Rev. Lett. 61, 609 (1988)), thus fixing an upper limit on the charge density value that can be stored in the system. Power varies linearly as a function of charge density in quantum well Q3, at least in the power range under consideration herein, i.e. from 0 to 40 W/cm$^2$. This is shown in FIG. 5, which is a plot of incorporated charge density as a function of time at different power densities ($P_O$=4 W/cm$^2$, and $\tau_{Oh}$=10 nsec).

It should be emphasized that the device described above provides performance comparable to that of the device described in [3]: if $\tau_{Oh}$ is of the order of 1 μsec, it is possible to obtain an electric field of 50 kV/cm, with a switching time of 1 μsec and with a power density of 1 W/cm$^2$.

Figure 6:
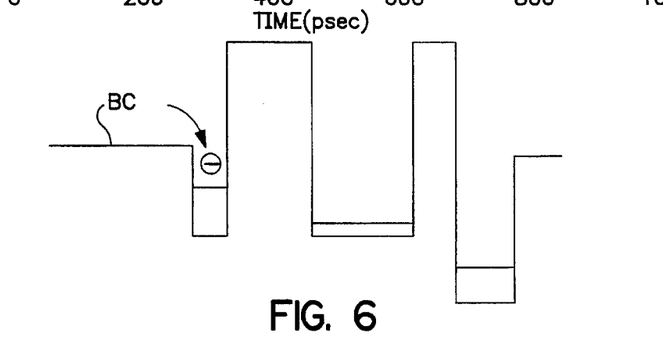
FIG. 6 is applicable to the FIG. 2 heterostructure and represents a model of the charge density accumulated in the electron collection well as a function of time following photoexcitation by means of a laser pulse of duration t=100 psec, for different values of mean laser power ($P_O$=50 W/cm$^2$)

The device can also be used in pulsed mode. This type of operation corresponds better to future implementations of the device in machines that include an internal clock. It also constitutes a good way of combatting the limit on performance that is due to lateral diffusion, as explained below. FIG. 6 is a plot of charge density stored in quantum well Q3 following a narrow laser pulse at time t= 100 psec. In this case, it is assumed that the pulse width is 2 psec, and that the mean power $P_O$=50 W/cm$^2$, with a repetition rate of 80 MHz. As could be expected, several tens of psec suffice to store a large population of electrons in quantum well Q3 because of the very short transfer times of electrons ($\tau_O$=1 psec and $\tau_e$=10 psec). This population deceases slowly with a time constant $\tau_{Oh}$ which, in the present case, is equal to 10 nsec.

It will be observed that this gives rise to a remarkable situation in which a single laser pulse suffices to establish a local electric field of about 50 kV/cm within the core of the device. Furthermore, the lifetime of this electric field can be adjusted by modulating $\tau_{Oh}$.

As already mentioned above, lateral diffusion puts a limit on diffraction efficiency and on space resolution. These limits can be estimated approximately on the basis of the diffusion coefficients of solid GaAs at T= 300K as being $D_n$=100 cm$^2$/sec and $D_p$= 10 cm$^2$/sec respectively for electrons and for holes (see in particular:

[11] S. M. Sze, Physics of semiconductor devices, Wiley-Interscience, page 55 (1981)).

At a time of about 100 psec, this gives rise to a considerable decrease in contrast in charge distribution having a period of 10 μm because of lateral diffusion. Given that in the device studied by A. Partovi et al. [3], the time for transfer towards the electrodes is about 100 psec, it is possible to explain, at least qualitatively, why those authors report poor space resolution. The lack of macroscopic transfer is inherent to our device which operates on the basis of local transfer and storage of carriers. Nevertheless, lateral diffusion of stored carriers takes place along the planes of quantum wells and can give rise to a serious limitation of performance.

Two solutions are proposed.

The first assumes that islands of InAs are incorporated in the electron-collection quantum wells. Providing the 2D layer of InAs islands is capable of storing high charge densities, the reduced lateral hopping type mobility of trapped electrons would be capable of "freezing" the electron populations spatially in the interference pattern. This would also reduce lateral diffusion of holes, by electrostatic attraction.

Another solution consists in using picosecond laser pulses. Assuming that lateral diffusion is high after a few hundreds of psec, it is still possible to define an operational time "window" as can be seen from FIG. 6.

The device is charged optically. That automatically reduces the number of periods which can be accessed optically. Taking the following as a condition for obtaining homogeneous charge density in the thickness:

$$exp(-N\Sigma_i \alpha_i x_i)=exp(-1) \quad (2)$$

where N is the number of periods and $\epsilon_i$ $\alpha_i$, $x_i$ represents the optical thickness of one period, where $\epsilon_i$ is obtained by summing over all of the absorbent layers in a period. When the excitation wavelengths are in resonance with the AlGaAs barriers, the number N of accessible periods is equal to 15, but for wavelengths in resonance with the narrow quantum wells of GaAs, N is equal to 50. These values correspond respectively to active regions of 0.2 μm and of 0.6 μm. However, in the second case, the charging times are longer.

For a narrow grid (Raman-Nath regime), first order diffraction efficiency is obtained, i.e. the intensity of the first order beam relative to the total transmitted intensity, in application of the following equation:

$$\frac{I_1}{I_0} \approx \left(\frac{2\pi\Delta\eta l}{\lambda}\right)^2 + \left(\frac{\Delta\alpha l}{2}\right)^2 \quad (3)$$

where $\Delta\eta$ and $\Delta\alpha$ are the refractive index and the absorption index coefficients of the photodiffractive grid for a wavelength $\lambda$. The variable l represents the total thickness of the grid. Equation (3) makes a simple estimate possible, assuming a wavelength where $\Delta\alpha=\Delta\alpha_{max}$ and $\Delta\eta$ is small in value. For $\Delta\alpha_{max}$=5000 cm$^{-1}$ and l=0.6 μm, the resulting diffraction efficiency is about 2%. The overall diffraction efficiency (which takes account of absorption) is two or three times smaller.

The key point for all-optical photodiffractivity is high local separation of photogenerated carriers. In the device described above, use is made of rapid Γ-X transfer of electrons from a narrow layer of GaAs to a layer of AlAs.

Other physical mechanisms and materials can be used for obtaining high local charge separation. In the following paragraph, some of them are reviewed.

In the Γ-X device based on GaAs/AlAs quantum filters, the read wavelength is defined by the active quantum well. For example, if 150 Å of GaAs is chosen for the active quantum well, then the operating wavelength is ≈850 nm. In theory, using InGaAs for the active quantum well ought to cause $\lambda_{read}$ to decrease at longer wavelengths. However, in practice, limitations are imposed by stress problems. It is necessary to have $In_xGa_{1-x}As$ where x= 50% so as to match the resonance of the active quantum well to the "telecommunications" wavelength which is 1.55 μm. The large lattice mismatch (3%) between this alloy and the GaAs substrate limits the total thickness of the active quantum well to less than 100 Å, in order to avoid dislocations being formed. Nevertheless, it will be observed that by using InGaAs with a low content of In (≈ 10%) in the active quantum well, it is possible to obtain a value of $\lambda_{read}$ of around 1 μm.

In order to be able to operate at 1.55 μm using the Γ-X method, it is necessary to make use of the AlSb/GaSb/AlGaSb system. That system has a small lattice mismatch (0.6%) between the binary limits and it has a unique characteristic: the minimum of the conduction band changes symmetry twice with increasing content of Al: from Γ to L for $x_{Al} \approx 0.25$ and from L to X for $x_{Al} \approx 0.65$. GaSb has another unique characteristic: the closeness of the Γ and L minima (only 90 meV), which results from the fact that, in GaSb/AlSb quantum wells where the thickness of the quantum wells does not exceed 40 Å, the quantized levels at the L point have less energy than those at the Γ point. This is due to the much larger electron mass at the L point; in this respect refer to the publication:

[12] U. Cebulla, G. Tränkle, U. Ziem, A. Forchel, G. Griffiths, H. Kroemer, S. Subanna, Phys. Rev. B 37, 6278 (1988)).

Taking account of these features of the GaSb/AlSb system, and applying the scheme of FIG. 2, going from left to right, the period of that heterostructure could be read as follows:

AlSb/GaSb(1)/AlGaSb/GaSb(2)/AlGaSb/InGaSb(3)/AlGaSb/GaSb(4)AlSb in which the content of Al in the AlGaSb is about 65%, and the thickness of the quantum well Q1 and of the quantum well Q4 is adjusted to ensure Γ-X electron transfer (i.e. the Γ level in the well is higher than the X level in the AlGaSb barrier). Similarly, the thickness of the quantum well Q2 is adapted to adjust exciton resonance at ambient temperature to 1.55 μm. The quantum well Q3 serves to store electrons and may be replaced by islands of InSb. The intermediate layer of AlGaSb is narrow enough to allow electrons to pass quickly, whereas the other layers of AlGaSb are thicker so as to effectively prevent holes from passing into quantum well Q1 and quantum well Q4.

In stressed heterostructures, the biaxial stress due to the lattice mismatch between adjacent materials can be considered as an additional degree of freedom for the optical properties of the heterostructure. In particular, in stressed heterostructures having a slight offset of the valence band, type I alignment is obtained for the heavy hole exciton (HH) and type II alignment is obtained for the light hole exciton (LH). This implies that when the electrons and the heavy holes are confined in the material of the quantum well, the light holes tend to be located in the barrier layer, in spite of the Coulomb attraction caused by the electron. In addition, appropriate design makes it possible for the HH level of the quantum well to have higher energy than the LH level in the barrier. This gives rise to rapid transfer rates from the HH state of the quantum well towards the barrier by means of an HH-LH diffusion process, which is closely analogous to Γ-X electron transfer in the GaAs/AlAs system. By way of example, mention may be made of such (In,Ga)As/GaAs and CdTe/(Cd,Zn)Te systems which have small chemical valence band offsets (respectively±10% and ±5%).

By way of example, such a structure based on CdTe/(Cd,Zn)Te may have the following elementary stacking:

(Cd, Zn)Te($x_{Zn}$ = 0.1)/CdTe(1)/(Cd, Zn)Te($x^{(I)}_{Zn}$ =

0.2)/CdTe(2)/(Cd, Zn)Te($x^{(II)}_{Zn}$ = 0.2)/(Cd, Hg)Te($x_{Hg}$ =

0.2)(3)/(Cd, Zn)Te($x^{(III)}_{Zn}$ = 0.1)

The structure is on an alloy of (Cd,Zn)Te in which the molar concentration of Zn is 10%. The concentration of Zn in the support alloy imposes a stress state throughout the entire heterostructure.

The combination CdTe(1)/(Cd,Zn)Te($x^{(I)}_{Zn}$=0.2) on a buffer of (Cd,Zn)Te($x_{Zn}$=0.1) constitutes the "quantum filter". This makes it possible for the heavy holes of the CdTe(1) well to transfer by means of the light holes states of the barrier (Cd,Zn)Te($x^{(I)}_{Zn}$=0.2) to the well CdTe(2) and thereafter by the tunnel effect to the well (Cd,Hg)Te($x_{Hg}$= 0.2)(3). Simultaneously, the electrons remain trapped in the CdTe(1) well.

Figure 7:
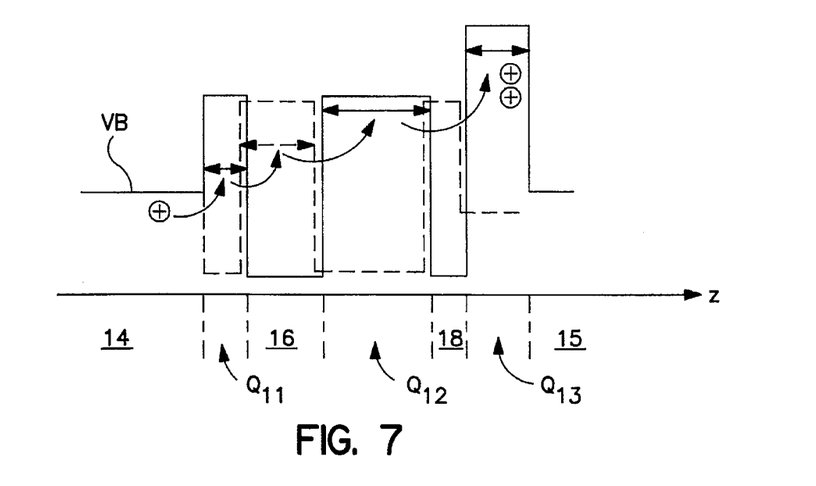
FIG. 7 is a diagram of the energy and potential levels in an all-optical elementary photodiffractive heterostructure constituting another embodiment of the invention that makes use of HH-LH diffusion.

This structure is shown in FIG. 7 in which there can be seen the energy levels and the potential levels of an elementary stack comprising a well Q11 of CdTe, a barrier 16 of (Cd,Zn)Te (20%), a wide intermediate well Q12 of CdTe, a narrow barrier Q12 (Cd,Zn)Te (20%) that the charge from the intermediate well 18 passes through by means of the tunnel effect, a collection well Q13 of (Cd,Hg)Te (20%), and a layer of matrix material of (Cd,Zn)Te (10%).

In FIG. 7, dashed lines show the potential levels of light holes (LH).

Double-headed arrows in dashed lines show the energy levels of light holes (LH).

Uninterrupted lines indicate the potentials of heavy holes (HH).

Double-headed arrows in interrupted lines indicate the energy levels of heavy holes (HH).

As can be seen from FIG. 7, the holes of the layer 14 are transferred by the HH-LH effect from intermediate well Q12, by the tunnel effect through the narrow barrier Q13, and into the collection well 17.

The electrons of the layer 14 relax in the well Q11 in which they are held by the barrier 16.

The invention is described herein for the particular case of photorefractive operators, but it applies to other operators using a high degree of separation between photoexcited charges to induce large variations $\Delta\eta$ and $\Delta\alpha$ in the electro-optical coefficients. By way of example, such an operator may be an optical modulator, that is optically controlled by a write beam that photo-creates an electric field which controls the absorption of a read beam by means of an electro-optical layer. The modulation of the read beam can thus be controlled in an all-optical manner.

In another variant, the barriers and the wells may be composition gradients (in particular the well Q4 in FIG. 2).

We claim:

1. An optical operator designed to be subjected to write radiation that controls the operator for the purpose of processing read radiation the operator receives, the operator including at least one elementary stack comprising first and second materials that form first and second collection quantum wells for collecting electrons and holes, which wells are disposed on opposing sides of an electro-optical structure which includes an intermediate quantum well formed of an electro-optical material and first and second quantum barriers interposed between said intermediate quantum well and the first and second collection quantum wells, the first quantum barrier having for charges of a particular sign, at least one energy level which is intermediate between energy levels presented for charges of the same sign by the intermediate quantum well and the first collection quantum well separated from said intermediate quantum well by the first quantum barrier, wherein said charges of the same sign when photoexcited by the write radiation in the first collection quantum well, pass through the first quantum barrier to said intermediate quantum well, taking one or more intermediate energy levels, while charges of the opposite sign are blocked by the first quantum barrier in the first collection quantum well, the operator being characterized in that the second quantum barrier is a barrier, narrower than the first quantum barrier, through which said charges of the opposite sign transferred into the intermediate quantum well pass by means of the tunnel effect to relax in the second collection quantum well.

2. An optical operator according to claim 1, characterized in that the elementary stack further includes a third collection quantum well similar in material and thickness to the first collection quantum well and also a third quantum barrier similar in material and thickness to the first quantum barrier, wherein charges, when photoexcited by the write radiation in the third collection quantum well, pass through the third quantum barrier taking one or more intermediate energy levels to relax in the second collection quantum well, and wherein charges of opposite sign are blocked in said third collection quantum well by said third quantum barrier.

3. An optical operator according to claim 1 or 2, characterized in that the transfer of charges from the first collection quantum well to the intermediate quantum well through the first quantum barrier is a Γ-X type electron transfer.

4. An optical operator according to claim 3, characterized in that the elementary stack is:

AlGaAs/GaAs/AlAs/GaAs/AlGaAs/InGaAs/AlAs/GaAs/AlGaAs, the read radiation being at a wavelength of about 850 nm, the write radiation being at a wavelength lying substantially in the range 650 nm to 750 nm.

5. An optical operator according to claim 1, characterized in that the electro-optical material forming the intermediate quantum well has an exciton wavelength in the vicinity of 1.55 μm.

6. An optical operator according to claim 5, characterized in that the electro-optical material forming the intermediate quantum well is $In_xGa_{1-x}As$, with x=0.50.

7. An optical operator according to claim 5, characterized in that the elementary stack is:

AlSb/GaSb(1)/AlGaSb/GaSb(2)/AlGaSb/InGaSb(3)/AlGaSb/GaSb(4)AlSb.

8. An optical operator according to claim 1 or 2, characterized in that the transfer of charges from the first collection quantum well to the intermediate quantum well through the first quantum barrier is a transfer of holes by HH-LH type diffusion.

9. An optical operator according to claim 8, characterized in that an elementary stack is a stack of (In, Ga)As/GaAs.

10. An optical operator according to claim 1, characterized in that the write beam is a pulsed beam having a pulse duration of order picosecond.

11. An optical operator according to claim 1, characterized in that it constitutes a photorefractive device, the electro-optical material forming the intermediate quantum well being subjected to an electric field diffraction grating created by the interference fringes of the write beam.

12. An optical operator according to claim 11, characterized in that islands of InAs are incorporated in said first and second materials forming the collection quantum wells.

13. An optical operator according to claim 8, characterized in that an elementary stack is a stack of CdTe/(Cd, Zn)Te.

* * * * *

UNITED STATES PATENT AND TRADEMARK OFFICE
CERTIFICATE OF CORRECTION

PATENT NO. : 5,521,398
DATED : May 28, 1996
INVENTOR(S) : Pelekanos et al.

It is certified that errors appear in the above-identified patent and that said Letters Patent is hereby corrected as shown below:

In column 8 at line 17, please delete " $E_i$ " and insert -- $\Sigma_i$ --.

In column 8 at line 18, please delete " $E_i$ " and insert -- $\Sigma_i$ --.

In column 9 at line 10, please delete " point; in " and insert -- point (in --.

In column 10 at line 24, please delete " Q13 " and insert -- 18 --.

In column 10 at line 25, please delete " 17 " and insert -- Q13 --.

Signed and Sealed this

Twenty-second Day of October, 1996

Attest:

BRUCE LEHMAN

*Attesting Officer*  *Commissioner of Patents and Trademarks*